(12) United States Patent
Beaudry

(10) Patent No.: US 10,941,757 B2
(45) Date of Patent: Mar. 9, 2021

(54) PORTABLE HYDRAULIC CYLINDER FOR THE RECHARGE OF WATER FOR EXTRA-VEHICULAR ACTIVITY

(71) Applicant: Hamilton Sundstrand Corporation, Charlotte, NC (US)

(72) Inventor: Aaron Beaudry, Houston, TX (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 324 days.

(21) Appl. No.: 16/105,613

(22) Filed: Aug. 20, 2018

(65) Prior Publication Data
US 2020/0056599 A1 Feb. 20, 2020

(51) Int. Cl.
*F04B 19/04* (2006.01)
*B64G 6/00* (2006.01)
*F04B 9/14* (2006.01)
*F04B 19/22* (2006.01)

(52) U.S. Cl.
CPC .............. *F04B 19/04* (2013.01); *B64G 6/00* (2013.01); *F04B 9/14* (2013.01); *F04B 19/22* (2013.01); *Y10T 137/86099* (2015.04)

(58) Field of Classification Search
CPC .......... F04B 19/04; F04B 19/22; F04B 53/22; B64G 6/00; F17C 2201/019; F17C 2227/048; F17C 13/025; F15B 2211/555
See application file for complete search history.

(56) References Cited

U.S. PATENT DOCUMENTS

| | | | |
|---|---|---|---|
| 3,079,765 A * | 3/1963 | Le Vantine | B64G 6/00 62/259.3 |
| 3,736,764 A * | 6/1973 | Chambers | A41D 13/0053 62/89 |
| 4,007,855 A | 2/1977 | Hierath et al. | |
| 4,021,148 A * | 5/1977 | Moskowitz | F04B 9/14 417/383 |
| 4,488,663 A | 12/1984 | Hooper et al. | |
| 10,307,622 B2 * | 6/2019 | Lawson | A62B 17/006 |
| 2019/0350751 A1 * | 11/2019 | Steele | B01J 20/2808 |

* cited by examiner

*Primary Examiner* — Umashankar Venkatesan
(74) *Attorney, Agent, or Firm* — Cantor Colburn LLP

(57) ABSTRACT

An extra-vehicular activity water system (EVAWS) is provided and includes a body defining an interior, a quick disconnect assembly fluidly communicative with the interior and with at least one of an external reservoir and a plumbing system of an extra-vehicular mobility unit (EMU), a piston and a pressure feedback feature. The piston includes a piston head configured to engage with the body to adjust a volume of the interior and a handle by which the piston head is movable to draw fluid through the quick disconnect assembly and into the interior from the external reservoir and to force fluid through the quick disconnect assembly and into the plumbing system from the interior. The pressure feedback feature maintains fluid forced into the plumbing system at pressures above and below minimum and maximum pressures, respectively.

20 Claims, 4 Drawing Sheets

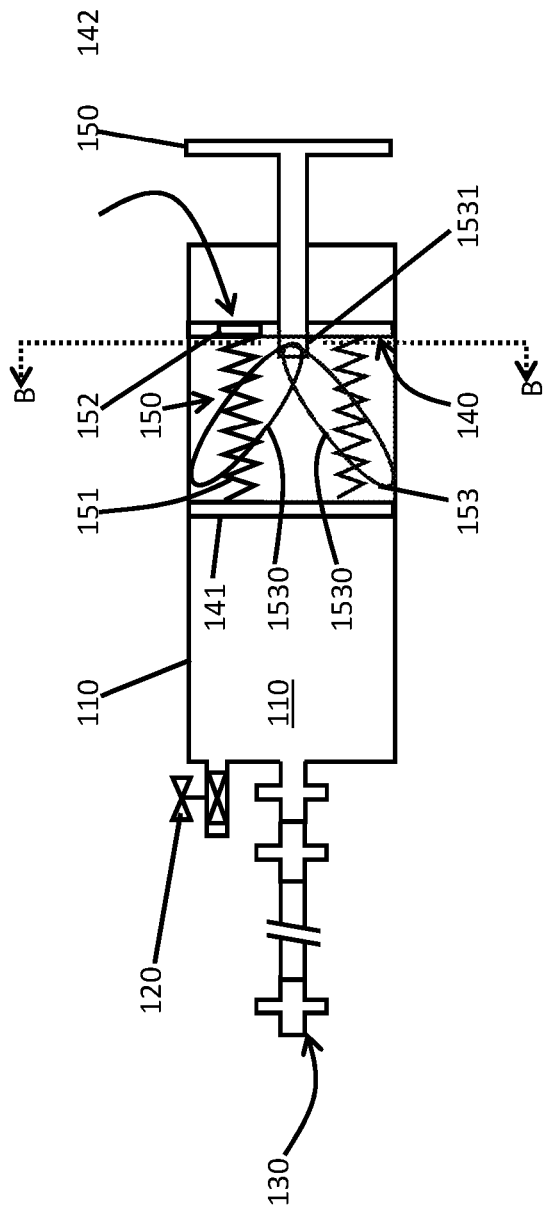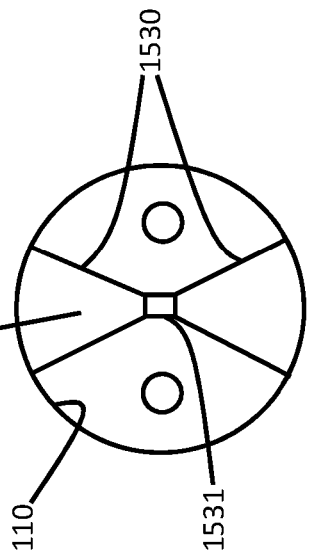
FIG. 4A
FIG. 4B

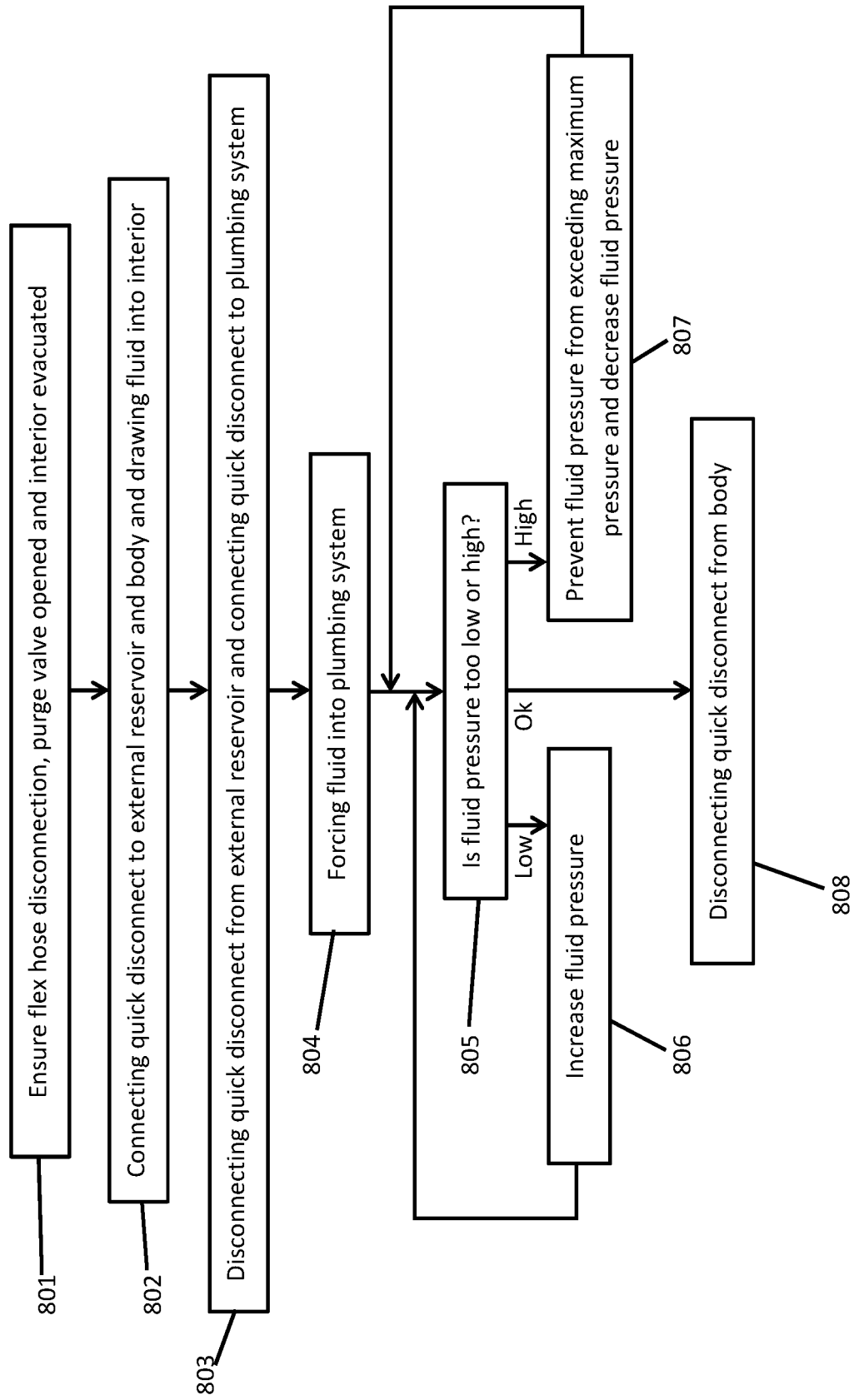

PORTABLE HYDRAULIC CYLINDER FOR THE RECHARGE OF WATER FOR EXTRA-VEHICULAR ACTIVITY

STATEMENT OF FEDERAL SUPPORT

This invention was made with government support under NNJ10TB01C awarded by NASA. The government has certain rights in the invention.

BACKGROUND

The following description relates to portable hydraulic cylinders and, more specifically, to a portable hydraulic cylinder for the recharge of water for extra-vehicular activity.

Spacesuits consume liquid water during operations in a vacuum and require periodic recharge. Recharging spacesuit water systems in orbit is currently accomplished through the use of a system that includes a portable water reservoir that stores a supply of water, a fluid pumping unit (FPU), which provides motive/pressure force for the water stored in the portable water reservoir, and various tubing assemblies to connect these systems to spacesuits.

While the system currently used to recharge spacesuit water systems is operable, it is complex in terms of hardware and costly.

BRIEF DESCRIPTION

According to an aspect of the disclosure, an extra-vehicular activity water system (EVAWS) is provided and includes a body defining an interior, a quick disconnect assembly fluidly communicative with the interior and with at least one of an external reservoir and a plumbing system of an extra-vehicular mobility unit (EMU), a piston and a pressure feedback feature. The piston includes a piston head configured to engage with the body to adjust a volume of the interior and a handle by which the piston head is movable to draw fluid through the quick disconnect assembly and into the interior from the external reservoir and to force fluid through the quick disconnect assembly and into the plumbing system from the interior. The pressure feedback feature maintains fluid forced into the plumbing system at pressures above and below minimum and maximum pressures, respectively.

In accordance with additional or alternative embodiments, the quick disconnect assembly includes a flexible hose and at least a two-way adapter.

In accordance with additional or alternative embodiments, the handle is operable to move the piston head linearly.

In accordance with additional or alternative embodiments, the minimum pressure is sufficient to overcome back pressures of the plumbing system and the maximum pressure is less than a maximum safe pressurization of the plumbing system.

In accordance with additional or alternative embodiments, the pressure feedback feature includes an elastic element interposed between the piston head and the handle and a pressure gauge.

In accordance with additional or alternative embodiments, the pressure feedback feature is configured to prevent the fluid forced into the plumbing system from exceeding the maximum pressure.

In accordance with additional or alternative embodiments, the pressure feedback feature includes at least one of a camming device, a burst disc and a relief valve.

According to an aspect of the disclosure, an extra-vehicular activity water system (EVAWS) is provided for use in a micro-gravity environment. The EVAWS includes a body defining an interior, a purge valve communicative with the interior, a quick disconnect assembly fluidly communicative with the interior and with at least one of an external reservoir and a plumbing system of an extra-vehicular mobility unit (EMU), a piston and a pressure feedback feature. The piston includes a piston head configured to engage with the body to adjust a volume of the interior and a handle by which the piston head is movable to draw fluid through the quick disconnect assembly and into the interior from the external reservoir and to force fluid through the quick disconnect assembly and into the plumbing system from the interior. The pressure feedback feature maintains fluid forced into the plumbing system at pressures above and below minimum and maximum pressures, respectively.

In accordance with additional or alternative embodiments, the body is substantially cylindrical and the purge valve is disposed at a side of the body opposite the piston head.

In accordance with additional or alternative embodiments, the purge valve includes an extension configured to access a central portion of the interior.

In accordance with additional or alternative embodiments, the quick disconnect assembly includes a flexible hose and at least a two-way adapter.

In accordance with additional or alternative embodiments, the handle is operable to move the piston head linearly.

In accordance with additional or alternative embodiments, the minimum pressure is sufficient to overcome back pressures of the plumbing system and the maximum pressure is less than a maximum safe pressurization of the plumbing system.

In accordance with additional or alternative embodiments, the pressure feedback feature includes an elastic element interposed between the piston head and the handle and a pressure gauge.

In accordance with additional or alternative embodiments, the pressure feedback feature is configured to prevent the fluid forced into the plumbing system from exceeding the maximum pressure.

In accordance with additional or alternative embodiments, the pressure feedback feature includes at least one of a camming device, a burst disc and a relief valve.

According to another aspect of the disclosure, a method of operating an extra-vehicular activity water system (EVAWS) is provided for use in a micro-gravity environment. The method includes evacuating air from an interior of a body, connecting a quick disconnect assembly fluidly communicative with the interior of the body with an external reservoir, drawing fluid through the quick disconnect assembly and into the interior from the external reservoir, connecting the quick disconnect assembly to a plumbing system of an extra-vehicular mobility unit (EMU), forcing fluid through the quick disconnect assembly and into the plumbing system from the interior and maintaining fluid forced into the plumbing system at pressures above and below minimum and maximum pressures, respectively.

In accordance with additional or alternative embodiments, the evacuating includes opening a purge valve and reducing a volume of the interior, the connecting of the quick disconnect assembly with the external reservoir includes closing the purge valve, extending a flexible hose toward the external reservoir and connecting an adapter at an end of the flexible hose to the external reservoir and the connecting of the quick disconnect assembly with the plumbing system includes disconnecting the quick disconnect assembly from the external reservoir, extending the flexible hose toward an inlet of the plumbing system and connecting the adapter at the end of the flexible hose to the inlet.

In accordance with additional or alternative embodiments, the evacuating, the drawing and the forcing are driven by human operation.

In accordance with additional or alternative embodiments, the maintaining of the fluid forced into the plumbing system below the maximum pressure includes preventing a pressure of the fluid forced into the plumbing system from exceeding the maximum pressure.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIG. 4A is a schematic diagram of a camming device in accordance with embodiments;

FIG. 4B is an axial view of the camming device taken along line B-B of FIG. 4A;

FIG. 8 is a flow diagram illustrating a method of operating an extra-vehicular activity (EVA) water system (EVAWS) for use in a micro-gravity environment in accordance with embodiments.

Figure 1:
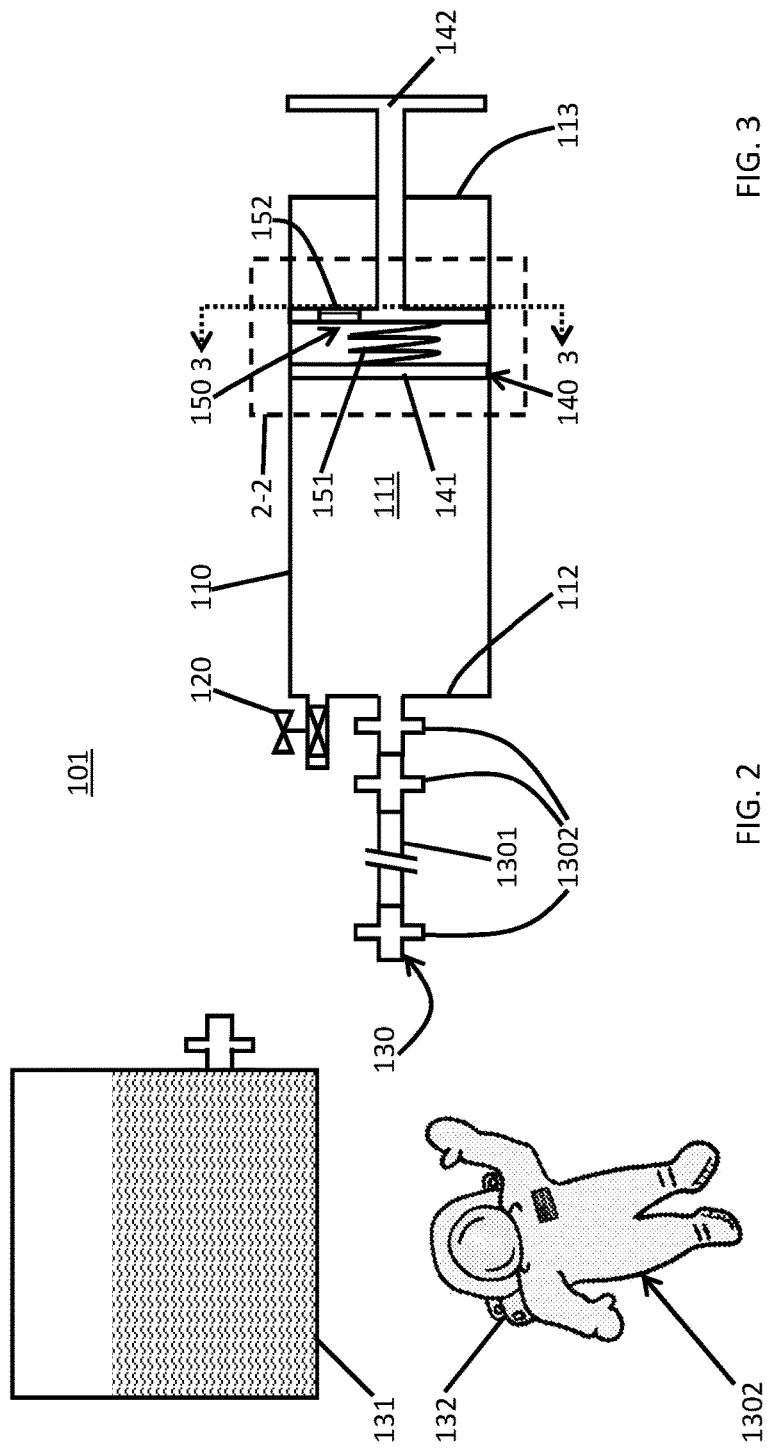
FIG. 1 is a schematic illustration of an extra-vehicular activity (EVA) water system (EVAWS) for an extra-vehicular mobility unit (EMU) in accordance with embodiments.

These and other advantages and features will become more apparent from the following description taken in conjunction with the drawings.

DETAILED DESCRIPTION

As will be described below, a system is provided to allow for a completion of spacesuit water system recharges using only human provided force. The system includes a quick-disconnect to interface with external systems and hardware elements, a flexible hose to provide operational geometric flexibility, a rigid container with an adjustable volume and a device that limits a maximum pressure that can be generated or applied by the operator through incorporation of a spring and a mechanical stop. During water recharge operations, the operator withdraws water from the external water reservoir, reconfigures the system to connect to the spacesuit water input location and then apply mechanical force to move the withdrawn water into the spacesuit.

An extra-vehicular mobility unit (EMU) is the spacesuit that currently operates aboard the international space station (ISS). The EMU provides crew member capability to conduct external (vacuum) activities related to ISS vehicle maintenance, repairs and upgrades. The EMU consumes water during its operation in the vacuum of space to provide critical life support functions to the astronaut and after each extra-vehicular activity or EVA (i.e., spacewalk) it may be necessary to recharge the EMU water tanks. Currently, this procedure is performed with a combination of hardware systems including a portable water reservoir or contingency water container, which provides the water for the recharge activity, a fluid pumping unit (FPU), which provides the motive force necessary to move the water from the portable water container through the ISS airlock plumbing and to overcome the back-pressure generated by the EMU water tanks, downstream airlock plumbing that passively routes water from the FPU to the EMU and EMU water tanks. The EMU water tanks are the ultimate destination for the water and have a capacity of about 10 lbs of water but also generate back-pressures acting against the airlock plumbing systems which the FPU has to overcome.

During recharge activities, the EMU(s) are initially configured to receive the water being provided (i.e., they are powered on, connected to airlock plumbing, etc.). Once the EMU configuration has been accomplished, the portable water container is affixed to the FPU, the downstream/external plumbing between the FPU and the EMU is configured (valves opened) and flow is initiated. The FPU then provides the flow delta pressure necessary to move the water from the portable water container through the FPU and airlock tubing and into the EMU. Once a sufficient recharge has been confirmed (done via analysis of EMU telemetry), the airlock plumbing valves are closed, the FPU is turned off, the EMU(s) are de-configured and the full system is returned to nominal stowage/non-operational configurations (or further activities may be performed).

The FPU typically contains a number of complex hardware elements that are both expensive to produce and difficult to assure the acceptable performance, life, safety and manufacture/assembly of.

With reference to FIG. 1, an extra-vehicular activity (EVA) water system (EVAWS) 101 is provided and may be configured for use in a micro-gravity environment, such as a spacewalk around the ISS. The EVAWS 101 includes a rigid or semi-rigid body 110 that is formed to define an interior 111, a purge valve 120 that is communicative with the interior 111, a quick disconnect assembly 130, a piston 140 and a pressure feedback feature 150.

When opened, the purge valve 120 allows gas inside the interior 111 to be purged. The quick disconnect assembly 130 includes a flexible hose 1301 and at least a two-way adapter 1302. As shown in FIG. 1, the quick disconnect assembly 130 includes a first two- or three-way adapter 1302, which is fluidly communicative with the interior 111, the flexible hose 1301 extending from the first two- or three-way adapter 1302 and a second two- or three-way adapter 1302 at a distal end of the flexible hose 1301. The second two- or three-way adapter 1302 can be fluidly communicative with at least one of an external reservoir 131 and a plumbing system 132 of an extra-vehicular mobility unit (EMU) 1320.

It is to be understood that the opposite ends of each of the first and second two- or three-way adapters 1302 can have male or female configurations in accordance with the complementary configurations of the body 110, the external reservoir 131 and the plumbing system 132. It is to be further understood that in the case of the second two- or three-way adapter 1302, the three-way case could selectively allow the flexible hose 1301 to be connected to the external reservoir 131 and the plumbing system 132 at a same time.

The piston 140 includes a piston head 141 and a handle 142. The piston head 141 is configured to engage with the body 110 and operable to adjust a volume of the interior 111. The handle 142 is configured to be gripped and manipulated by an operator such that the piston head 141 is movable relative to the body 110. In particular, the handle 142 can be manipulated such that the piston head 141 generates a negative pressure inside the interior 111 which in turn draws fluid through the quick disconnect assembly 130 and into the interior 111 from the external reservoir 131. Conversely, the handle 142 can be manipulated such that the piston head 141 generates a positive pressure inside the interior 111 which in turn forces fluid through the quick disconnect assembly 130 and into the plumbing system 132 from the interior 111.

Figure 3:
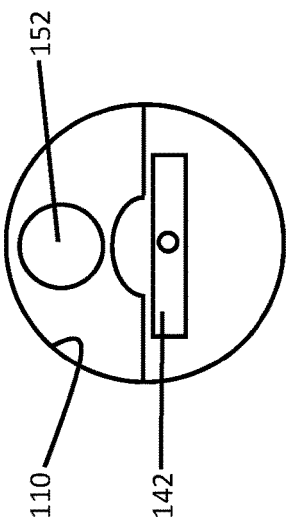
FIG. 3 is a cross-sectional view taken along line 3-3 of FIG. 1.
Figure 2:
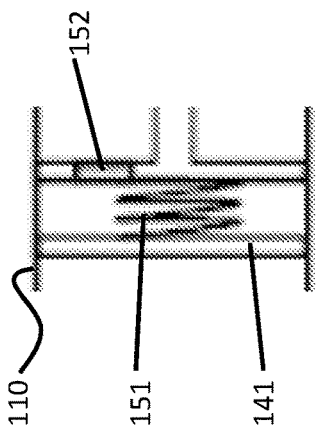
FIG. 2 is an enlarged view of the portion of FIG. 1 encompassed by square 2-2.

With continued reference to FIG. 1 and with additional reference to FIGS. 2 and 3, the pressure feedback feature 150 may include an elastic element 151 that is interposed between the piston head 141 and the handle 142 and a pressure gauge 152. The pressure feedback feature 150 is configured to measure a pressure of the fluid that is forced into the plumbing system 132 via the pressure gauge 152 and to use that measurement in concert with the elastic element 151 to maintain a pressure of the fluid that is forced into the plumbing system 132 above a minimum pressure and below a maximum pressure. The minimum pressure can be defined at or above a back pressure of the plumbing system 132. The maximum pressure can be defined below a maximum safe pressure at which the plumbing system 132 can be pressurized.

In accordance with further embodiments and with reference to FIGS. 4A and 4B and FIGS. 5 and 6, the pressure feedback feature 150 can be further configured to provide a fixed upper limit on the pressure of the fluid forced into the plumbing system 132 to thus actively prevent the fluid forced into the plumbing system 132 from exceeding the maximum pressure. In these cases, the pressure feedback feature 150 may include at least one of a camming device 153 (see FIGS. 4A and 4B), a burst disc 154 (see FIG. 5) and a relief valve 155 (see FIG. 6).

In the case of the camming device 153 as shown in FIGS. 4A and 4B, the camming device 153 could be used to provide a fixed upper limit on fluid pressure that the EVAWS 101 can generate. The camming device 153 could include cam features 1530 that pivotably connect to a common point 1531 of the handle 142 and can be characterized with a special configuration of the elastic element 151 to prevent internal obstructions during operation of the piston 140 such that a maximum allowable deflection of the elastic element 151 is permitted as the handle 142 is depressed. This maximum allowable deflection can be calculated in reference to the maximum allowable pressure supply and a resultant maximum allowable operator linear force.

With the maximum applicable force and subsequent spring deflection known, a mechanical/geometric offset feature on the invention interior can be constructed to engage the camming device 153 once this maximum deflection has been exceeded. At this point, any further depression of the force applicator (and subsequent pressure rise) is prevented by the camming action of the camming device 153. Negative force application on the handle 142 would reset the camming device 153 not being re-engaged until applied linear force exceeds maximum allowable limits.

Figure 5:
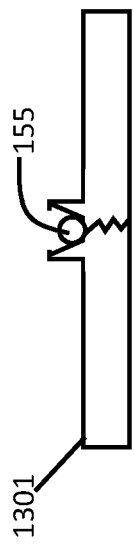
FIG. 5 is a schematic diagram of a burst disc in accordance with embodiments.

In the case of the burst disc 154 as shown in FIG. 5, the burst disc 154 can be provided at multiple locations including, but not limited to, the flexible hose 1301 whereby the burst disc 154 is configured to burst in response to a pressure of fluid within the flexible hose 1301 exceeding a predefined level (e.g., the maximum pressure).

Figure 6:
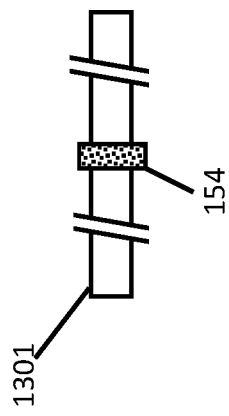
FIG. 6 is a schematic diagram of a relief valve in accordance with embodiments.

In the case of the relief valve 155 as shown in FIG. 6, the relief valve 155 can be provided at multiple locations including, but not limited to, the flexible hose 1301 whereby the relief valve 155 is configured to open in response to a pressure of fluid within the flexible hose 1301 exceeding a predefined level (e.g., the maximum pressure).

With reference back to FIG. 1 and in accordance with embodiments, the body 110 may be substantially cylindrical in shape with opposite axial end walls 112 and 113. In such cases, the purge valve 120 and the piston head 141 may be disposed at axial end wall 112 and axial end wall 113, respectively, such that the purge valve 120 and the piston head 141 are provided at opposite sides of the body 110. With this or other configurations, the piston head 141 can be moved linearly toward the purge valve 120 to reduce the volume of the interior 111 or linearly away from the purge valve 120 to increase the volume of the interior 111.

Figure 7:
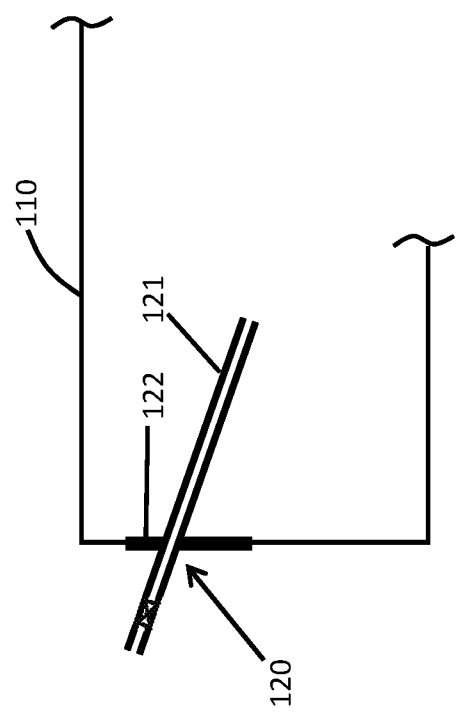
FIG. 7 is a schematic diagram of components of a purge valve in accordance with further embodiments.

In accordance with further embodiments and with reference to FIG. 7, the purge valve 120 can include an extension part 121. The extension part 121 is generally hollow and extends from the purge valve 120 into a central portion of the interior 111 in a depth-wise dimension. The extension part 121 can be coupled to the purge valve 120 by a compliant gasket 122 that allows the extension part 121 to be articulated within the interior 111 with multiple degrees of freedom such that any gas bubbles that may be disposed within the central portion of the interior 111 can be accessed by the extension part 121 and drawn out of the interior 111 through the extension part 121.

With reference to FIG. 8, a method of operating the EVAWS 101 as described herein is provided.

As shown in FIG. 8, the method initially includes an operation during which an operator ensures that the flexible hose 1301 is disconnected and that the piston 140 is fully depressed with the purge valve 120 opened to thereby evacuate or nearly evacuate the interior 111 (801). If this is the case, the purge valve 120 is verifiably closed, the quick disconnect assembly 130 is connected to the body 110 and to the external reservoir 131 and the piston 140 is moved through the body 110 by an application of force by an operator through the handle 142 to increase the volume of the interior 111 to thereby draw fluid from the external reservoir 131, through the quick disconnect assembly 130 and into the interior 111 (802).

Once a desired amount of fluid has been drawn into the interior 111, the quick disconnect assembly 130 can be disconnected (actually or effectively) from the external reservoir 131 and connected to the plumbing system 132 (803). Subsequently, the piston 140 is moved through the body 110 by an application of force by an operator through the handle 142 to decrease the volume of the interior 111 to thereby drive fluid from the interior 111, through the quick disconnect assembly 130 and into the plumbing system 132 (804). At this point, the pressure feedback feature 150 can be inspected to determine if the pressure of the fluid being forced into the plumbing system 132 is above the minimum pressure and below the maximum pressure (805). If the pressure of the fluid is determined to be insufficient (i.e., incapable of overcoming back pressures in the plumbing system 132), the pressure of the fluid can be increased (806). If the pressure of the fluid is determined to be excessive, the pressure can be prevented from increasing further and decreased (807).

Once a sufficient amount of fluid has been transferred into the plumbing system 132, the quick disconnect assembly 130 can be disconnected from at least the body 110 (808).

Technical effects and benefits of the present disclosure are the provision of an EVAWS 101 that does not require significant crew interaction or time and that is of relatively simple and inexpensive construction.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An extra-vehicular activity water system (EVAWS), comprising:
    a body defining an interior;
    a quick disconnect assembly fluidly communicative with the interior and with at least one of an external reservoir and a plumbing system of an extra-vehicular mobility unit (EMU);
    a piston comprising a piston head configured to engage with the body to adjust a volume of the interior and a handle by which the piston head is movable to draw fluid through the quick disconnect assembly and into the interior from the external reservoir and to force fluid through the quick disconnect assembly and into the plumbing system from the interior; and
    a pressure feedback feature to maintain fluid forced into the plumbing system at pressures above and below minimum and maximum pressures, respectively.

2. The EVAWS according to claim 1, wherein the quick disconnect assembly comprises a flexible hose and at least a two-way adapter.

3. The EVAWS according to claim 1, wherein the handle is operable to move the piston head linearly.

4. The EVAWS according to claim 1, wherein the minimum pressure is sufficient to overcome back pressures of the plumbing system and the maximum pressure is less than a maximum safe pressurization of the plumbing system.

5. The EVAWS according to claim 1, wherein the pressure feedback feature comprises an elastic element interposed between the piston head and the handle and a pressure gauge.

6. The EVAWS according to claim 1, wherein the pressure feedback feature is configured to prevent the fluid forced into the plumbing system from exceeding the maximum pressure.

7. The EVAWS according to claim 1, wherein the pressure feedback feature comprises at least one of a camming device, a burst disc and a relief valve.

8. An extra-vehicular activity water system (EVAWS) for use in a micro-gravity environment, the EVAWS comprising:
    a body defining an interior;
    a purge valve communicative with the interior;
    a quick disconnect assembly fluidly communicative with the interior and with at least one of an external reservoir and a plumbing system of an extra-vehicular mobility unit (EMU);
    a piston comprising a piston head configured to engage with the body to adjust a volume of the interior and a handle by which the piston head is movable to draw fluid through the quick disconnect assembly and into the interior from the external reservoir and to force fluid through the quick disconnect assembly and into the plumbing system from the interior; and
    a pressure feedback feature to maintain fluid forced into the plumbing system at pressures above and below minimum and maximum pressures, respectively.

9. The EVAWS according to claim 8, wherein the body is substantially cylindrical and the purge valve is disposed at a side of the body opposite the piston head.

10. The EVAWS according to claim 8, wherein the purge valve comprises an extension configured to access a central portion of the interior.

11. The EVAWS according to claim 8, wherein the quick disconnect assembly comprises a flexible hose and at least a two-way adapter.

12. The EVAWS according to claim 8, wherein the handle is operable to move the piston head linearly.

13. The EVAWS according to claim 8, wherein the minimum pressure is sufficient to overcome back pressures of the plumbing system and the maximum pressure is less than a maximum safe pressurization of the plumbing system.

14. The EVAWS according to claim 8, wherein the pressure feedback feature comprises an elastic element interposed between the piston head and the handle and a pressure gauge.

15. The EVAWS according to claim 8, wherein the pressure feedback feature is configured to prevent the fluid forced into the plumbing system from exceeding the maximum pressure.

16. The EVAWS according to claim 8, wherein the pressure feedback feature comprises at least one of a camming device, a burst disc and a relief valve.

17. A method of operating an extra-vehicular activity water system (EVAWS) for use in a micro-gravity environment, the method comprising:
    evacuating air from an interior of a body;
    connecting a quick disconnect assembly fluidly communicative with the interior of the body with an external reservoir;
    drawing fluid through the quick disconnect assembly and into the interior from the external reservoir;
    connecting the quick disconnect assembly to a plumbing system of an extra-vehicular mobility unit (EMU);
    forcing fluid through the quick disconnect assembly and into the plumbing system from the interior; and
    maintaining fluid forced into the plumbing system at pressures above and below minimum and maximum pressures, respectively.

18. The method according to claim 17, wherein:
    the evacuating comprises opening a purge valve and reducing a volume of the interior,
    the connecting of the quick disconnect assembly with the external reservoir comprises closing the purge valve, extending a flexible hose toward the external reservoir and connecting an adapter at an end of the flexible hose to the external reservoir, and
    the connecting of the quick disconnect assembly with the plumbing system comprises disconnecting the quick disconnect assembly from the external reservoir, extending the flexible hose toward an inlet of the plumbing system and connecting the adapter at the end of the flexible hose to the inlet.

19. The method according to claim 17, wherein the evacuating, the drawing and the forcing are driven by human operation.

20. The method according to claim 17, wherein the maintaining of the fluid forced into the plumbing system below the maximum pressure comprises preventing a pressure of the fluid forced into the plumbing system from exceeding the maximum pressure.

* * * * *